(12) United States Patent
Tsolis (10) Patent No.: US 9,471,701 B2
(45) Date of Patent: Oct. 18, 2016

(54) METHODS AND SYSTEMS FOR SECURE IN-NETWORK INSERTION OF WEB CONTENT AND WEB SERVICES

(75) Inventor: Georgios Tsolis, Patras (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 512 days.

(21) Appl. No.: 13/536,285

(22) Filed: Jun. 28, 2012

(65) Prior Publication Data

US 2014/0006924 A1    Jan. 2, 2014

(51) Int. Cl.
*G06F 17/00* (2006.01)
*G06F 17/30* (2006.01)
*G06Q 30/02* (2012.01)

(52) U.S. Cl.
CPC ..... *G06F 17/30893* (2013.01); *G06F 17/3089* (2013.01); *G06Q 30/0269* (2013.01); *G06Q 30/0277* (2013.01)

(58) Field of Classification Search
CPC .................................................. G06F 17/2247
See application file for complete search history.

(56) References Cited

U.S. PATENT DOCUMENTS

| 6,687,252 | B1 | | 2/2004 | Bertrand et al. | |
|---|---|---|---|---|---|
| 7,228,493 | B2 | * | 6/2007 | Kosak | G06F 17/3089 707/E17.116 |
| 7,533,144 | B2 | * | 5/2009 | Kassab | G06F 17/30893 707/E17.116 |
| 7,937,336 | B1 | | 5/2011 | Maynard-Zhang et al. | |
| 8,271,868 | B2 | * | 9/2012 | Sinyagin | G06F 17/30893 715/234 |
| 8,725,792 | B1 | * | 5/2014 | Pik | G06F 17/30899 709/203 |
| 2002/0128908 | A1 | | 9/2002 | Levin et al. | |
| 2002/0169540 | A1 | | 11/2002 | Engstrom | |
| 2006/0100928 | A1 | | 5/2006 | Walczak, Jr. et al. | |
| 2006/0101334 | A1 | | 5/2006 | Liao et al. | |
| 2007/0005731 | A1 | | 1/2007 | Lection et al. | |
| 2007/0016857 | A1 | | 1/2007 | Polleck et al. | |
| 2007/0073806 | A1 | * | 3/2007 | Srinivas et al. | 709/203 |
| 2007/0101258 | A1 | * | 5/2007 | Xu et al. | 715/516 |
| 2007/0242814 | A1 | | 10/2007 | Gober | |
| 2008/0250035 | A1 | | 10/2008 | Smith et al. | |

(Continued)

FOREIGN PATENT DOCUMENTS

| EP | 1 398 968 A2 | 3/2004 |
|---|---|---|
| WO | 9962011 | 12/1999 |

(Continued)

OTHER PUBLICATIONS

PCT International Search Report and Written Opinion related to Int'l Application No. PCT/US2013/048366; dated (mailed) Oct. 22, 2013, 11 pages.

(Continued)

*Primary Examiner* — Keith Bloomquist
(74) *Attorney, Agent, or Firm* — Finnegan, Henderson, Farabow, Garrett & Dunner, LLP (57) ABSTRACT

A method of web content and web services insertion is provided. The method includes receiving response data sent in response to request data, wherein the response data comprises a response header and a first webpage. The method also includes after a determination that insertion data is to be included with the first webpage, updating the response data by adding insertion data to the first webpage. The insertion data includes a script element that identifies a script that includes an instruction to display a second webpage within the first webpage. The method also includes providing the updated response data.

21 Claims, 7 Drawing Sheets

(56) References Cited

U.S. PATENT DOCUMENTS

| | | |
|---|---|---|
| 2009/0030757 A1 | 1/2009 | Admon et al. |
| 2009/0144159 A1 | 6/2009 | Bashyam |
| 2010/0169763 A1* | 7/2010 | Zahavi .................... H04L 67/20 715/234 |

FOREIGN PATENT DOCUMENTS

| | | |
|---|---|---|
| WO | WO 2004/080073 A2 | 9/2004 |
| WO | WO 2004/104735 A2 | 12/2004 |
| WO | WO 2007/141555 A1 | 12/2007 |
| WO | WO 2008/056358 A2 | 5/2008 |
| WO | 2008075883 | 6/2008 |
| WO | 2011/007357 A2 | 1/2011 |

OTHER PUBLICATIONS

International Search Report and Written Opinion of the International Searching Authority for International Application No. PCT/US2008/013430, mailed May 26, 2009, 14 pages.

"16.5 Inline frames: the IFRAME element," from *HTML 4.01 Specification, WC3 Recommendation*, Dec. 24, 1999 (13 pages).

"4.7.2 The iframe element," from HTML 5, *A vocabulary and associated APIs for HTML and XHTML: WC3 Recommendation*, Oct. 28, 2014 (29 pages).

Extended European Search Report dated Apr. 6, 2016 from EPO Application No. 13810286.8; 10 pages.

* cited by examiner

```
<!DOCTYPE html>
<html lang="en">
    <head>
        <meta charset="utf-8">
        <title>My webpage</title>
    </head>
    <body>
        <br>Hello World!</br>
    </body>
</html>
```

ORIGINAL WEBPAGE 310

FIG. 3A

```
<!DOCTYPE html>
<html lang="en">
    <head>
        <meta charset="utf-8">
        <script src="[script URI]"></script>
        <script> [script content] </script>
        <noscript> ... </noscript>
        ...
        <title>My webpage</title>
    </head>
    <body>
        <br>Hello World!</br>
    </body>
</html>
```

MODIFIED WEBPAGE 320

FIG. 3B

```
new_iframe = document.createElement("IFRAME");
new_iframe.setAttribute("src", [inserted webpage URI]);

new_iframe.style.position = "relative";
new_iframe.style.top = 10+"px";
new_iframe.style.left = 20+"px";
new_iframe.style.height = 30+"px";
new_iframe.style.width = 400+"px";

document.body.appendChild(new_iframe);
```

JAVASCRIPT SCRIPT 410

METHODS AND SYSTEMS FOR SECURE IN-NETWORK INSERTION OF WEB CONTENT AND WEB SERVICES

BACKGROUND INFORMATION

The World Wide Web ("Web") has evolved from a collection of static documents interconnected through hyperlinks to an environment that enables seamless information sharing and collaboration between users and content providers, where the boundaries between domains, web sites, applications, and services are blurring. Many applications are migrating to server infrastructure ("Cloud") and no longer require local installation of software, or local storage. Despite the proliferation of mobile applications ("Apps"), which allow end-users to obtain access to Web application and services, the Web Browser ("Browser") remains the primary application used for the purpose of obtaining Web content.

Nowadays, most electronic devices employed by people in their everyday lives, such as desktop, laptop and netbook computers, smart phones and feature phones, touch-screen tablets and e-book readers, gaming consoles, high-end cars, and TVs, are equipped with a Browser that serves as the entry point to the Internet, not only in a wired, but increasingly more so in a wireless manner.

Internet Service Providers ("ISP") and Mobile Network Operators ("MNO") are always looking for ways to differentiate themselves and enhance their subscribers' experience. For example, ISPs and MNOs would like to deliver to their subscribers integrated cloud applications and services, customized messages and notifications, advertising and promotional content, and so forth.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Exemplary embodiments disclosed herein are directed to methods and systems for secure in-network insertion of web content and web services into original webpages requested by the subscribers. The insertion method is transparent to the owners of the requested webpages, and it is also seamless to subscribers, because it does not require installation of additional software or Browser plug-ins (add-ons). The insertion method can be compliant with the industry standards, such as ones published by the Internet Engineering Task Force ("IETF") and World Wide Web Consortium ("W3C"). Furthermore, the insertion method preserves the security and the integrity of both the original webpage and the inserted web content.

Figure 1:
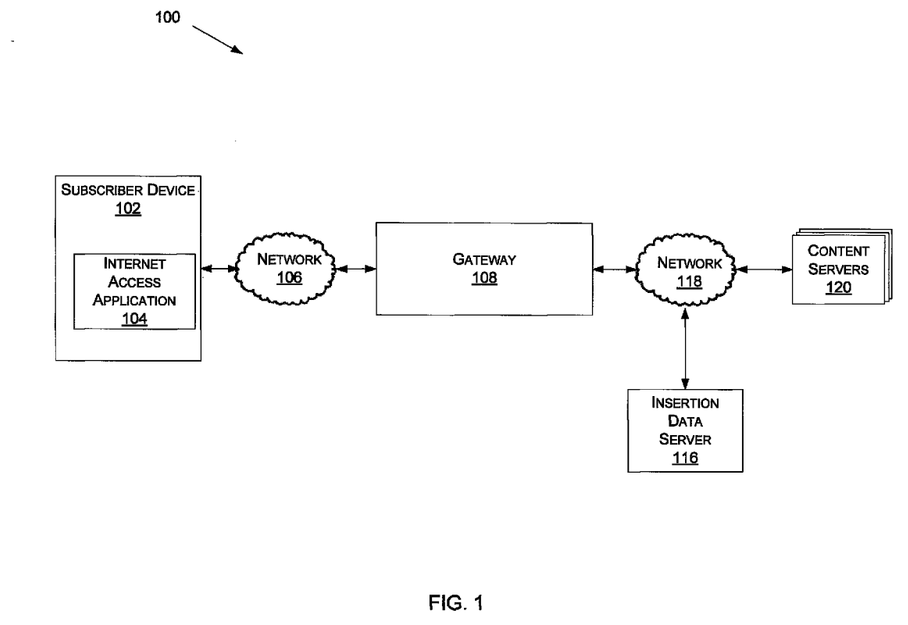
FIG. 1 illustrates a block diagram of an exemplary system.

FIG. 1 is a block diagram of an exemplary system. The exemplary system can include, among other things, a subscriber device 102, a gateway 108, one or more content servers 120, networks 106 and 118, and internet access application 104. Gateway 108 can be coupled to both network 106 and network 118, network 118 can be further coupled to content servers 120 and insertion data server 116, and network 106 can be further coupled to subscriber device 102. Subscriber device 102 can include or be coupled to internet access application 104.

Subscriber device 102 is a computer program or hardware device that has networking capabilities. For example, subscriber device 102 can be a desktop, a laptop or a netbook computer, a smart phone, a feature phone, a touch-screen tablet, an e-book reader, a gaming console, a high-end car, a TV, and so forth. Subscriber device 102 can receive request data from internet access application 104, transmit that data to a remote device, receive response data in response to the request data, and provide the response data back to internet access application 104. The request data and the response data can be transmitted over any suitable communication protocol, such as HTTP. Subscriber device 102 can also include a display that can be used by internet access application to present received response data to the subscriber (user).

Internet access application 104 is a client application, such as a Browser, a mobile app, or any other software and/or hardware application that can access remote web content and present that content to a subscriber. Internet access application 104 can run either on subscriber device 102 or on a Cloud, that is, on a remote device (not shown) coupled to subscriber device 102, for example, through network 106. Internet access application 104 can receive a command from a subscriber, transfer to subscriber device 102 request data corresponding to the command, receive from subscriber device 102 response data in response to the request data, and present the response data to the subscriber.

Request data can include a uniform resource identifier ("URI") that identifies a particular resource (e.g., a webpage, a script or a service) and the remote server that hosts the particular resource. Response data can include, among other things, the particular resource requested.

Networks 106 and 118 can be any type of network, including, but not limited to, any combination of wide area networks (WANs), local area networks (LANs), or wireless networks suitable for networking communication such as Internet communication.

Gateway 108 is one or more network devices that can intercept, analyze, and manipulate data exchanged between networks 106 and 118. Gateway 108 can be used by an ISP/MNO to deliver various services on the intercepted data, such as web content insertion, application detection, bandwidth throttling, intrusion/malware detection, firewalling, network address translation, and traffic optimization. Moreover, gateway 108 can serve as an integration point for "Control-Plane" interfaces, such as the Authentication, Authorization and Accounting ("AAA"). Gateway 108 can also have access to the ISP/MNO Subscriber Profile Repository ("SPR"), either via the Policy and Charging Rules Framework (PCRF) infrastructure, or directly, using various database or directory (e.g. LDAP) access protocols.

Gateway 108 can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD-RAM (digital versatile disk-random access memory), or a semiconductor memory. Alternatively, the methods can be implemented in hardware components or combinations of hardware and software such as, for example, ASICs, special purpose computers, or general purpose computers.

Content servers 120 are servers that can host web resources, such as content (e.g., webpages), scripts (e.g., JavaScript scripts), services (e.g., applications), and so forth. Content servers 120 can receive from subscriber device 102 request data, process the request data, and return response data back to subscriber device 102. Content servers 120 can be web servers, enterprise servers, etc.

Insertion data server 116 is a designated server, or a load-balanced pool of servers, that can store insertion data. Insertion data server 116 can be a remote server (e.g., one of content servers 120) or it can be integrated within gateway 108.

Figure 2:
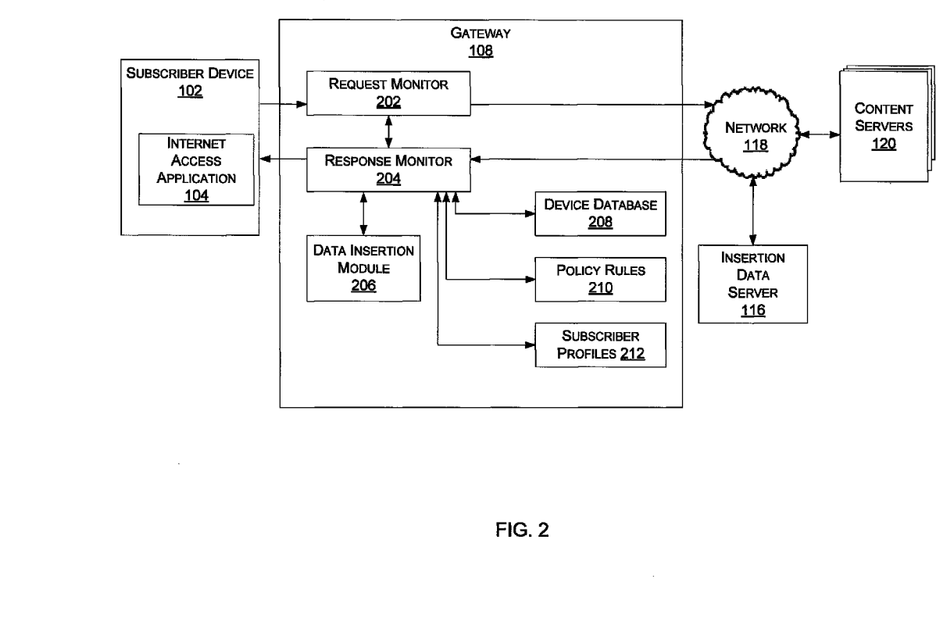
FIG. 2 is a block diagram illustrating an embodiment of an exemplary secure in-network web content insertion scheme in the exemplary system of FIG. 1.

FIG. 2 is a block diagram illustrating an embodiment of the exemplary system of FIG. 1. Insertion data server 116 and networks 106 and 118 were omitted from FIG. 2 for simplicity. In the embodiment, gateway 108 includes a request monitor 202, a response monitor 204, a data insertion module 206, a device database 208, policy rules 210, and subscriber profiles 212.

Request monitor 202 can be a software program and/or a hardware device that receives or intercepts the request data, such as an HTTP request for a specific URI, from subscriber device 102. If the request data includes virtual domains (discussed below), request monitor 202 can replace the virtual domains with real domains. Request monitor 202 can also extract header information from the HTTP request, such as information identifying the subscriber device or the origin of the webpage from which the request was issued. Request monitor 202 can transfer that information to response monitor 204, either directly or by storing it in a memory (not shown) accessible to both request monitor 202 and response monitor 204. Finally, request monitor transmits the request data to content servers 120.

Response monitor 204 can be a software program or a hardware device that receives response data from content servers 120 and insertion data server 116. After receiving the response data, response monitor 204 can determine, based on criteria discussed below, whether additional data should be inserted into the response data. If so, response monitor 204 can send the response data to data insertion module 206, receive modified response data from data insertion module 206, and transmit the modified response data to subscriber device 102. Otherwise, response monitor 204 can retransmit the response data, unchanged, to subscriber device 102.

Data insertion module 206 can be a software program and/or a hardware device that receives response data from response monitor 204, acquires insertion data, modifies response data by adding the insertion data to the response data, and transmits the modified response data back to response monitor 204.

Device database 208 can be a software program and/or a hardware device that stores information regarding the various subscriber devices 102. The stored information can include, for example, the technical capabilities of a particular subscriber device 102 and/or its internet access application 104. The stored information can also indicate whether a particular device is eligible for data insertion, further described below.

Policy rules 210 can be a database implemented in a software program and/or a hardware device that stores information regarding policy actions that can be applied on requests or responses, such as enabling data insertion, described below. Policy rules 210 can also store information regarding the conditions accompanying the policy actions, such as the list of eligible subscriber devices 102 or the list of eligible webpage URIs, as well as the arguments required for applying these actions, such as the URIs of the script resources to be inserted.

Subscriber profiles 212 can be a database implemented in a software program and/or a hardware device that stores information regarding subscribers and their data sessions, such as a unique subscriber identifier (e.g., MSISDN or NAI), an IP address currently assigned to subscriber device 102 and Access Point Name (APN), subscription information (e.g., data plan), personalization information (e.g., subscriber preferences), etc.

Device database 208, policy rules 210 and subscriber profiles 212 can each communicate with response monitor 204, and can each be located either within gateway 108 or on a remote server that can communicate with gateway 108.

In an example embodiment, a subscriber is using internet access application 104 and requests a particular webpage, by typing the requested webpage in the address bar or by clicking on a hyperlink at another webpage, for example. In response, internet access application 104 issues an HTTP request that includes a URI of the requested webpage. For example, the URI can have the following format:

http://[web server address]:[port]/[webpage name]

[Web server address] can either be the domain name (e.g., "www.wikipedia.com") or the IP address (e.g., "208.80.154.225") of the content server 120 that hosts the requested webpage. [Webpage name] indicates the name of the particular webpage on that content server 120, for example, "wild/DNA". Sometimes, [webpage name] can be omitted from the URI, indicating that the default webpage of the content server 120 is being requested. The prefix "http://" identifies the communication protocol to be used to retrieve the webpage, and can be changed to any other suitable protocol, such as "https://" for secure webpages. The communication port is indicated by [port], but it, too, can be omitted if the default port for the given protocol (e.g., port 80 for HTTP) is to be used.

Request monitor 202 receives the HTTP request from internet access application 104, optionally performs a virtual domain name replacement (discussed below), optionally extracts header information from the HTTP request, and finally forwards the HTTP request to network 118. If the URI contained in the HTTP request is correct and corresponds to an existing webpage on an existing content server 120, response monitor 204 receives from that content server 120 an HTTP response that includes the requested webpage. The webpage can be, for example, an HyperText Markup Language ("HTML") file. HTML is a standard language that is used to describe the contents of a webpage.

Response monitor 204 can analyze the received webpage and determine whether data insertion is required. In some embodiments, to determine whether data insertion is required, response monitor 204 can identify the subscriber device 102 and check, using device database 208, whether the particular device, or the particular type of devices, is eligible for data insertion. Identifying the subscriber device can be achieved, for example, by obtaining the User-Agent field from the header information of the corresponding HTTP request previously received by request monitor 202. In some embodiments, the webpage URI is matched against a predefined list of URIs to determine whether data insertion should be enabled (if the URI is in a "white list") or disabled (if the URI is in a "black list"). In some embodiments, the determination can also be based on the content type of the HTTP response. For example, response monitor 204 can decide that only HTTP responses containing HTML pages can undergo data insertion. In some embodiments, response monitor 204 can check policy rules 210 to determine whether data insertion is allowed for the particular subscriber, session, or transaction. In some embodiments, subscribers can be allowed to disable data insertion, and response monitor 204 can determine whether it was disabled or not by accessing subscriber profiles 212.

In some embodiments, the determination as to whether data insertion is performed is done at an earlier stage, by request monitor 202. Thus, request monitor 202, after receiving the HTTP request from internet access application 104, can decide, using the databases and the methods described above, whether data insertion is to be performed, and provide its decision to response monitor 204. Response monitor 204 can then determine whether data insertion is to be performed simply by looking at the decision provided by request monitor 202.

If it is determined that no data insertion is required, response monitor 204 provides the received webpage to internet access application 104. If data insertion is required, response monitor 204 provides the webpage to data insertion module 206, receives from data insertion module 206 a modified webpage, and forwards the modified webpage to internet access application 104. Regardless of whether the webpage is modified or not, internet access application 104 receives the webpage, processes it, and displays it to the subscriber.

Figure 3A:
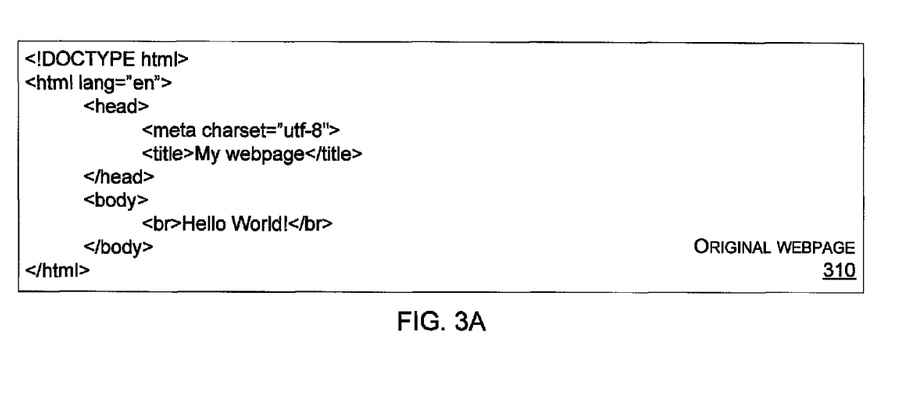
FIG. 3A illustrates an embodiment of an exemplary original webpage.

FIG. 3A illustrates an exemplary original webpage 310 requested by the subscriber. In an embodiment, original webpage 310 is described in HTML. Original webpage 310 can include a header section (contained between tags <head> and </head>) that can include HTML elements such as webpage title, webpage description, scripts, etc. Original webpage 310 can also have a body section (contained between tags <body> and </body>) that can include HTML elements such as text paragraphs, images, buttons, hyperlinks to other webpages, and so forth.

Data insertion module 206, upon receiving original webpage 310 from response monitor 204, can add insertion data to original webpage 310. Insertion data can be added to the header section, the body section, or in any other location in the file, preferably in compliance with the various industry standards and/or requirements of internet access application 104.

Figure 3B:
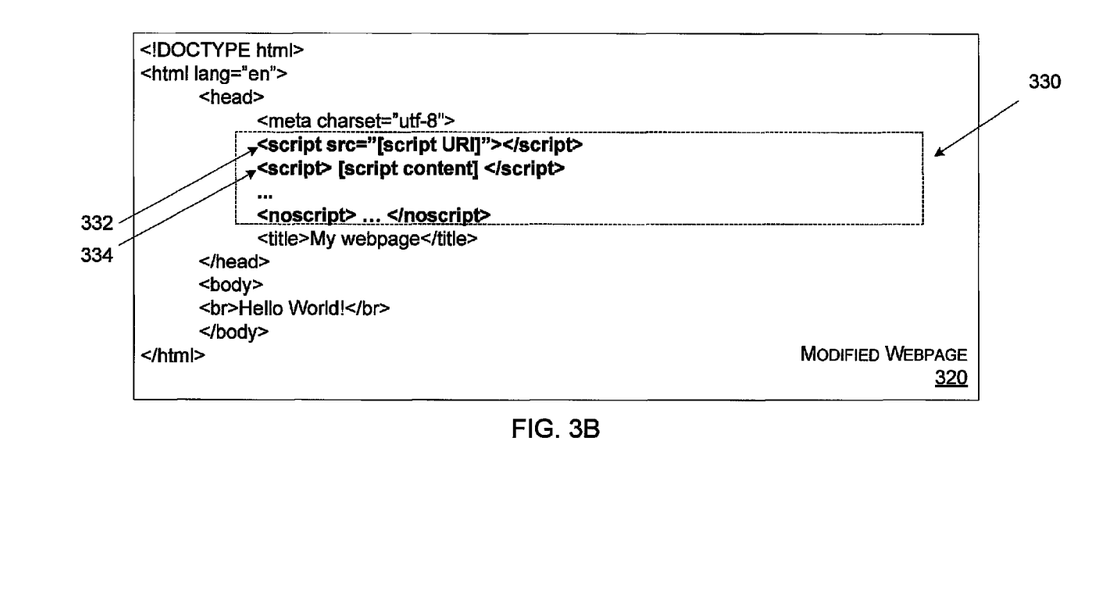
FIG. 3B illustrates an embodiment of an exemplary modified webpage.

FIG. 3B illustrates an exemplary modified webpage 320 obtained as a result of inserting insertion data 330 into original webpage 310. In some embodiments, insertion data 330 can include one or more script elements, such as a remote script element 332 or an embedded script element 334. The scripts can be of any type or language that is supported by the internet access application 104 and, preferably, by industry standards. For example, insertion data 330 can include scripts that comply with one of the dialects of ECMAScript (ECMA-262), such as JavaScript, JScript, or any other existing or future scripting language supported by internet access applications, such as VBScript, etc. After adding insertion data 330, data insertion module 206 transfers modified webpage 320 to response monitor 204, which can provide modified webpage 320 to internet access application 104.

Internet access application 104 receives modified webpage 320 and displays it to the subscriber by processing the HTML elements contained in it. While some HTML elements, such as title, text, and buttons, can be displayed immediately, other HTML elements, such as images, can include URIs (links) to remote content, which has to be retrieved before it could be processed and displayed. To retrieve the remote content, internet access application 104 issues a new HTTP request containing its URI.

At some point during the processing of modified webpage 320, internet access application 104 starts processing elements contained in insertion data 330, including, for example, embedded script element 334 and remote script element 332. Embedded script element 334 includes the actual contents of the script (indicated by [script content]) which can be immediately executed by internet access application 104. In contrast, remote script element 332 does not include the script contents; instead, it includes a URI (indicated as [script URI]) that identifies the remote location of a resource (file) containing the script itself. Therefore, in the case of remote script element 332, internet access application 104 first retrieves the script file by issuing a corresponding HTTP request, waits to obtain the script file from response monitor 204, and only then executes the script. For the purpose of optimization, script files can be pre-processed (e.g., by the ISP/MNO) to minimize their file size. For example, unnecessary content, such as white spaces or comments, can be removed from the script file. Additionally, HTTP caching directives can be inserted (e.g., by response monitor 204) that would instruct internet access application 104 to keep the script in cache for a longer period of time, anticipating subsequent HTTP requests for the same script.

In some embodiments, scripts can, upon their execution, add additional content and content areas to modified webpage 320. In other words, scripts can include commands that instruct internet access application 104 to create and display new graphical elements.

In some embodiments, a script can add a new content area by creating a new inline frame ("iframe") element, and adding it, for example, to the <body> section of modified webpage 320. Iframes allow inserting contents from another webpage into a rectangular frame within an existing webpage. Written in HTML form, an iframe has the following format: <iframe src=[inserted webpage URI]>[backup content]</iframe> where [inserted webpage URI] points to a remote webpage that will be loaded and displayed within the iframe, and [backup content] includes HTML content that will be displayed if internet access application does not support iframes. In addition, the iframe's dimensions and position within the webpage can be defined, as will be shown below.

Figure 4:
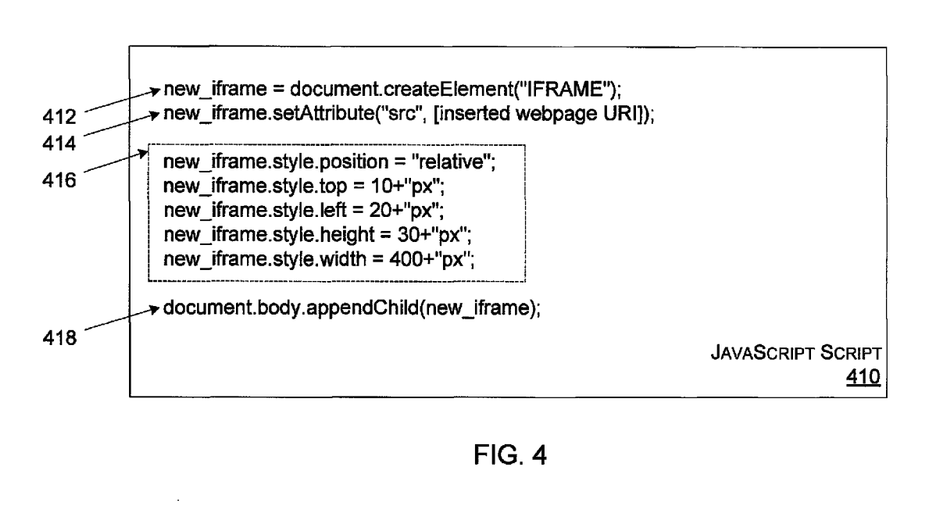
FIG. 4 illustrates an embodiment of an exemplary JavaScript script.

FIG. 4 illustrates an exemplary JavaScript script 410 for inserting an iframe containing remote content into the webpage. JavaScript script 410 can be either directly embedded in embedded script element 334, or it can be hosted remotely and referenced from remote script element 332, as discussed above. When internet access application 104 runs JavaScript script 410, it creates a new iframe 412 and adds the new iframe to the <body> section 418 of modified webpage 320. The size and the position of the iframe is also defined by the script (designated as 416). The contents to be displayed within the iframe are defined in the "src" attribute 414, which points to a remote webpage (indicated by [inserted webpage URI]). As a result, internet access application 104 will retrieve the remote webpage via another HTTP request and display the contents of the remote webpage inside the iframe, the iframe being positioned at the predefined location within the displayed modified webpage 320.

In some embodiments, JavaScript script 410 can add more than one iframe, and it can also include other types of HTML elements.

Figure 5A:
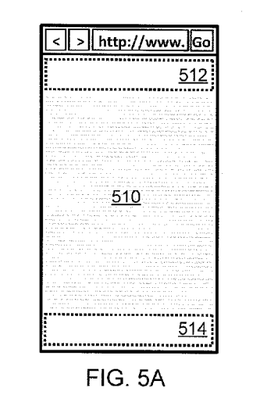
FIGS. 5A, 5B, 5C and 5D illustrate different embodiments of exemplary visual configurations of inserted web content within the modified webpage.

FIGS. 5A, 5B, 5C and 5D illustrate the various exemplary configurations in which one or more iframes can be added to a webpage. FIG. 5A illustrates an exemplary footer/header configuration, in which a header iframe 512 and a footer iframe 514 are added above and below the original content 510 of the webpage, respectively. The added iframes can be set to remain in constant location either relative to the webpage boundaries (by scrolling in and out of the screen together with the content of the webpage) or relative to the screen boundaries (by not scrolling in and out of the screen).

Figure 5B:
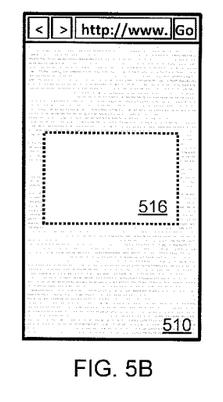

FIG. 5B illustrates an exemplary overlay configuration, in which an overlay iframe 516 is added such as to cover a portion of the original content 510 of the webpage. Overlay iframe 516 can be set to remain in a constant location either relative to the webpage boundaries or relative to the screen boundaries. Furthermore, if internet access application 104 and/or subscriber device 102 support dynamic viewport (i.e., zooming in and out), overlay iframe 516 can either adjust its size to the zoom level or remain constant in size irrespective of the zoom level. In some embodiments, more than one overlay iframes 516 can be added. In some embodiments, overlay iframe 516 can be semi-transparent, or original content 510 can be dimmed to make the overlay stand out more.

Figure 5C:
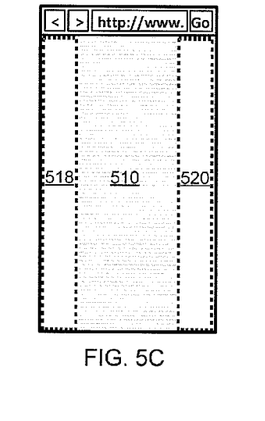

FIG. 5C illustrates an exemplary sidebar configuration, in which a left bar iframe 518 and a right bar iframe 520 are added to the left and to the right of original content 510 of the webpage, respectively. The added iframes can be set to remain in constant location either to the webpage boundaries or relative to the screen boundaries.

Figure 5D:
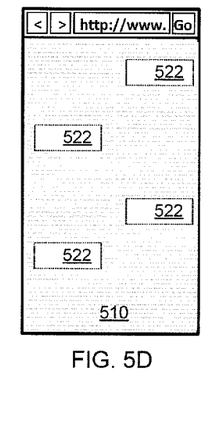

FIG. 5D illustrates an exemplary in-line configuration, in which one or more iframes 522 are added in-line with original content 510 of the webpage. The added iframes 522 can replace some portions of original content 510. For example, when the webpage carries Rich Internet Application (RIA) content (e.g., Adobe Flash or Microsoft Silverlight) that cannot be displayed by the browser, some or all occurrences of such content embedded in original content 510 of the webpage can be replaced in-line with iframes 522 containing standard-based content that is supported by the browser and can be displayed.

Hosting the Scripts and the iframe Content

In some embodiments, insertion data has two or more remote script elements 332, and the script files corresponding to all, or at least two or more remote script elements 332, are hosted (stored) on the same remote server. The remote server hosting the script files can be a designated server, such as insertion data server 116. As an example, two JavaScript files, "header.js" and "footer.js", are hosted on insertion data server 116, and the IP address of insertion data server 116 is 1.2.3.4. Insertion data 330 can then contain, among other things, the following remote script elements 332:

<script src="http://1.2.3.4/header.js"></script>
<script src="http://1.2.3.4/footer.js"></script>

Hosting the scripts on the same server can be advantageous for many reasons, one of which is related to the Same Origin Policy. Same Origin Policy is a web security concept that permits documents or scripts originating from (hosted on) the same server to access each other's methods and properties with no specific restrictions, but prevents access to most methods and properties across pages originating from different servers. Thus, scripts header.js and footer.js in the example above would be able to access each other's methods and properties, because they originate from the same server—insertion data server 116.

In some embodiments, the different remote contents added to the webpage by the scripts (e.g., via iframes) also originate from the same server. That is, if several iframes containing several remote webpages are added to the current webpage, the several remote webpages can be hosted on the same server, according to some embodiments. Moreover, in some embodiments, the remote content is hosted on the same server that hosts the scripts themselves.

Figure 6:
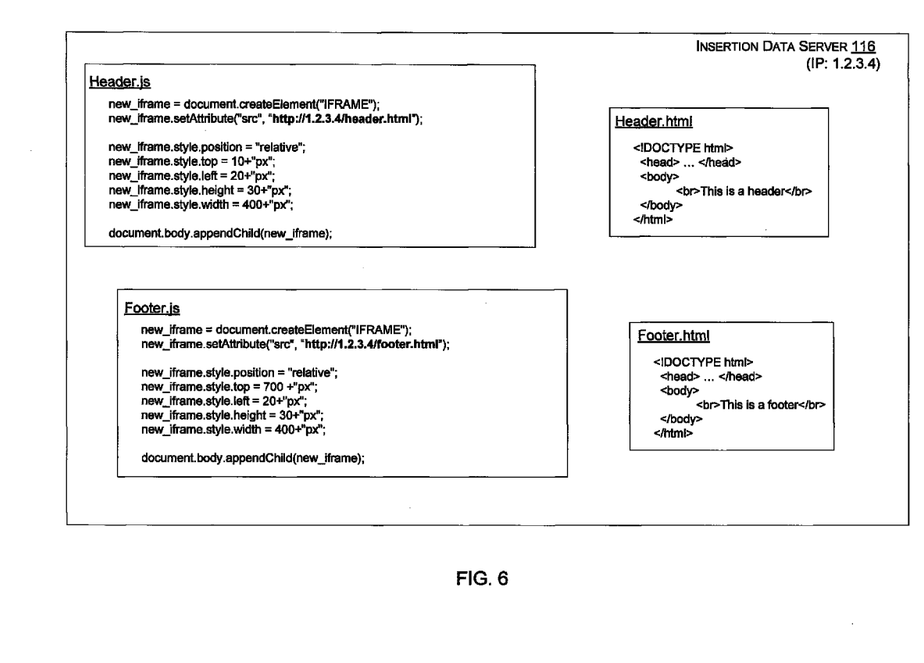
FIG. 6 illustrates an embodiment of an exemplary insertion data server and the files hosted thereon.

FIG. 6 illustrates an exemplary insertion data server 116, in accordance with the example discussed above. In the example, insertion data server 116 has an IP address of 1.2.3.4 and hosts at least two script files (header.js and footer.js) and at least two webpages (header.html and footer.html). Script header.js adds an iframe containing the webpage "header.html", and script footer.js adds an iframe containing the webpage "footer.html". The scripts position the iframes at the top and at the bottom of the webpage in which the iframes are inserted (e.g., modified webpage 320) by setting the iframes' "top" attributes accordingly.

Hosting the scripts and webpages inserted thereby on the same server achieves several advantages. For example, the Same Origin Policy in this case allows the scripts to communicate with each other, the inserted webpages to communicate with each other (e.g., using the W3C HTML5 Web Messaging API), and each script to communicate with each inserted webpage. At the same time, since the original webpage is typically not hosted on the same server as the added scripts and the inserted webpages, the look-and-feel or the behavior of the original webpage cannot be manipulated by the added scripts or the inserted webpages, and vice versa. This provides security and ownership protection to both the original and the inserted webpages.

For additional security, in some embodiments, the real address (either domain name or IP address) of insertion data server 116 does not appear on the modified webpage. Instead, data insertion module 206 can use a predefined virtual (e.g., non-existent) domain name when referring to any elements hosted on insertion data server 116. In addition, if the remote content inserted by the scripts is also hosted on insertion data server 116, as in the example in FIG. 6, the scripts can also refer to the remote content using the virtual domain name. For example, if the predefined virtual domain name is chosen to be "www.virtual-domain.com", the remote script objects 334 as they appear in insertion data 330 can look like this:

<script src="http://www.virtual-domain.com/header.js"></script>
<script src="http://www.virtual-domain.com/footer.js"></script> and the instructions within the scripts can look like this, respectively:

```
new_iframe.setAttribute("src",
    "http://www.virtual-domain.com/header.html");
new_iframe.setAttribute("src",
    "http://www.virtual-domain.com/footer.html");
```

The virtual domain names can be resolved (replaced) by request monitor 202. Request monitor 202 receives and analyzes request data, such as HTTP requests, from internet access application 104. In some embodiments, request monitor 202 can detect, within the request data, requests that include the predefined virtual domain name. After the predefined virtual domain name is detected, request monitor 202 can modify the request data by replacing any occurrence of the predefined virtual domain name with a real domain name or IP address of a predefined server, such as insertion data server 116. Gateway 108 then sends the modified request data to network 118, which directs the request in accordance with the replaced domain name. The use of a virtual domain name also offers the flexibility of relocating the scripts to a different insertion data server or a pool of servers without having to change the URIs of the scripts.

In some embodiments, the remote content inserted by data insertion module 206 (either directly or via scripts, as discussed above) can include Web Services calls. Web Services is a software technology that allows applications running on different servers to seamlessly communicate with each other. For example, a webpage executed by internet access application 104 on subscriber device 102 can use Web Services to send data to an application running on a remote server, and can receive data from that application. A Web Service invocation can be implemented using Asynchronous JavaScript and XML ("AJAX"), and using the XMLHTTPRequest ("XHR") object.

In some embodiments, XHR requests are issued from the remote webpages included in the iframes inserted by the scripts, where the remote webpages are hosted on insertion data server 116. In some embodiments, XHR requests to servers other than insertion data server 116 may not be allowed by internet access application 104, because of the Same Origin Policy rules. In some embodiments, this can be overcome by intercepting the HTTP responses to such cross-origin XHR requests and adding to the HTTP responses headers that expressly allow calls from webpages originating from insertion data server 116.

For example, request monitor 202 can identify HTTP requests originating from the inserted remote webpages, and response monitor 204 can then modify the HTTP headers of the HTTP responses that are received in response to the identified HTTP requests. In order to identify HTTP requests originating from the inserted remote webpages, request monitor 202 can examine HTTP headers of all incoming HTTP requests and identify, for example, all requests having a simple request method (i.e., OPTIONS, HEAD, GET or POST) whose header includes the field "Origin", and whose "Origin" field corresponds to insertion data server 116.

After identifying a request originating from an inserted webpage, request monitor 202 can, for example, instruct response monitor 204 to intercept the HTTP response that would be received in response to that request. When the HTTP response is intercepted by response monitor 204, response monitor 204 can modify the HTTP response such as to indicate to internet access application that XHR requests issued from webpages hosted on insertion data server 116 should be allowed. This can be achieved, for example, by adding to the HTTP response the following W3C Cross-Origin Resource Sharing ("CORS") headers:

```
HTTP Request:
OPTIONS|HEAD|GET|POST http://... HTTP/1.1
Origin: http://[insertion data server 116 address]:[port]
Access-Control-Request-Method: . . .
Access-Control-Request-Headers: . . .
HTTP Response:
HTTP/1.1 200 OK
Access-Control-Allow-Origin: http://[insertion data server 116
address]:[port]
Access-Control-Allow-Methods: . . .
Access-Control-Allow-Headers: . . .
``` where [insertion data server 116 address] can be an IP address or a domain name, either real or virtual, of insertion data server 116.

Figure 7:
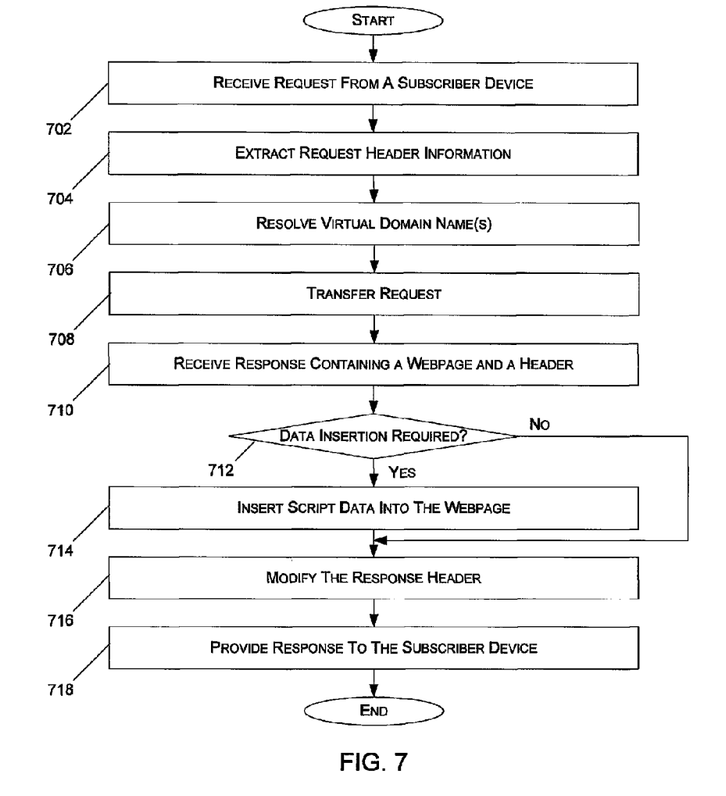
FIG. 7 is a flowchart representing an exemplary method of secure in-network insertion of web content and web services.

FIG. 7 is a flowchart illustrating an exemplary method of secure in-network insertion of web content and web services. The method can be performed by a gateway (e.g., gateway 108). While the flowchart discloses the following steps in a particular order, it is appreciated that at least some of the steps can be moved, modified, combined, or deleted where appropriate.

The method receives (702) a request from a subscriber device (e.g., subscriber device 102). The method then optionally extracts (704) header information from the request. Header information can include, for example, information regarding the subscriber device and information regarding the origin of the website initiating the request. Next, the method optionally resolves (706) virtual domain names, by detecting whether the request includes predefined virtual domain names and replacing each occurrence of the predefined virtual domain name in the request with a real domain name or IP address. The method then transfers (708) the request, for example, to a network, such as network 118.

At step 710, the method receives a response corresponding to the transferred request. The response can contain, for example, a header (e.g., an HTTP header) and a webpage. The method then determines (712) whether to perform data insertion. This determination can be based on various factors. For example, the method can check whether the particular device, or the particular type of devices, is eligible for data insertion. Identifying the subscriber device can be achieved, for example, by obtaining the User-Agent field from the header information that was extracted at 704. The determination can also be based on the content type of the response. For example, the method can decide to perform data insertion only if the response is an HTTP response containing an HTML webpage. The method can also check whether data insertion is allowed for the particular subscriber, session or transaction, by accessing one or more databases (e.g., device database 208, policy rules 210 and subscriber profiles 212). If the method decides (712) that data insertion is not required, it proceeds to step 716. Otherwise, the method proceeds to step 714.

At step 714, the method inserts script data into the webpage included in the response. The script data can be added, for example, into the <head> or the <body> sections of the webpage. The scripts can be hosted on a designated server (e.g., on insertion data server 116) and the script data can indicate the name of the designated server. In some embodiments, instead of indicating the real name of the designated server, script data can indicate a virtual domain name. The scripts, upon their execution, can insert new content and content areas into the webpage. The new content areas can be, for example, iframes that include remote webpages, where the remote webpages can be hosted, for example, on the same designated server. In some embodiments, remote webpages can include Web Services calls.

Next, the method can insert (716) header data into the header of the response. The inserted header data can allow cross-origin Web Service calls from the remote webpages included in the inserted iframes. Finally, the method can provide (718) the response to the subscriber device (e.g., subscriber device 102).

The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing secure in-network insertion of web content and web services disclosed herein.

In the preceding specification, the subject matter has been described with reference to specific exemplary embodiments. It will, however, be evident that various modifications and changes may be made without departing from the broader spirit and scope of the subject matter as set forth in the claims that follow. The specification and drawings are accordingly to be regarded as illustrative rather than restrictive. Other embodiments may be apparent to those skilled in the art from consideration of the specification and practice of the invention disclosed herein.

The work that led to the development of the subject matter disclosed herein was co-financed by Hellenic Funds and by the European Regional Development Fund (ERDF) under the Hellenic National Strategic Reference Framework (ESPA) 2007-2013, according to Contract no. MICRO2-08.

What is claimed is:

1. A method of web content and web services insertion, the method comprising:
   acquiring request data corresponding to a request for a first webpage;
   determining whether insertion data is to be included with the first webpage based on a type of device included in a request header of the request data;
   receiving response data sent in response to the request data, wherein the response data comprises a response header and a first webpage;
   after a determination that insertion data is to be included with the first webpage, updating the response data by adding insertion data to the first webpage, the insertion data comprising a script element that identifies a script that includes an instruction to display a second webpage within the first webpage, wherein the script further includes an instruction to add, to the first webpage, an inline frame associated with the second webpage, and wherein the script and the second webpage are hosted on a designated server having a first internet address;
   modifying the response data to indicate that one or more requests issued from the second webpage hosted on the designated server are allowed; and
   providing the updated response data.

2. The method of claim 1, wherein the script includes an instruction specifying the first internet address, and the instruction to display the second webpage comprises the first internet address.

3. The method of claim 1, wherein the request header includes information identifying the origin of the request data.

4. The method of claim 1, wherein the script includes an instruction specifying a second internet address, and the instruction to display the second webpage comprises the second internet address, the method further comprising:
   updating the request data by replacing any occurrence of the second internet address within the request data with the first internet address; and
   providing the updated request data.

5. The method of claim 1, wherein the second webpage comprises one or more web services invocations, the method further comprising:
   adding, to the response header, instructions enabling the web services invocations.

6. The method of claim 5, wherein the web services invocations are enabled based on the response data indicating that one or more requests issued from the second webpage hosted on the designated server are allowed.

7. The method of claim 1, wherein determining whether insertion data is to be included with the first webpage is based on a particular subscriber.

8. A non-transitory computer readable medium storing a set of instructions that are executable by a computer to cause the computer to perform a method of web content and web services insertion, the method comprising:
   acquiring request data corresponding to a request for a first webpage;
   determining whether insertion data is to be included with the first webpage based on a type of device included in a request header of the request data;
   receiving response data sent in response to the request data, wherein the response data comprises a response header and a first webpage;
   after a determination that insertion data is to be included with the first webpage, updating the response data by adding insertion data to the first webpage, the insertion data comprising a script element that identifies a script that includes an instruction to display a second webpage within the first webpage, wherein the script further includes an instruction to add, to the first webpage, an inline frame associated with the second webpage, and wherein the script and the second webpage are hosted on a designated server having a first internet address;
   modifying the response data to indicate that one or more requests issued from the second webpage hosted on the designated server are allowed; and
   providing the updated response data.

9. The non-transitory computer readable medium of claim 8, wherein the script includes an instruction specifying the first internet address, and the instruction to display the second webpage comprises the first internet address.

10. The non-transitory computer readable medium of claim 8, wherein the request header includes information identifying the origin of the request data.

11. The non-transitory computer readable medium of claim 8, wherein the script includes an instruction specifying a second internet address, and the instruction to display the second webpage comprises the second internet address, the method further comprising:
  updating the request data by replacing any occurrence of the second internet address within the request data with the first internet address; and
  providing the updated request data.

12. The non-transitory computer readable medium of claim 8, wherein the second webpage comprises one or more web services invocations, the method further comprising:
  adding, to the response header, instructions enabling the web services invocations.

13. The non-transitory computer readable medium of claim 12, wherein the web services invocations are enabled based on the response data indicating that one or more requests issued from the second webpage hosted on the designated server are allowed.

14. The non-transitory computer readable medium of claim 8, wherein determining whether insertion data is to be included with the first webpage is based on a particular subscriber.

15. A gateway coupled to a first network and a second network, the gateway configured to acquire request data corresponding to a request for a first webpage and comprising:
  a response monitor configured to:
    determine whether insertion data is to be included with the first webpage based on a type of device included in a request header of the request data, and
    receive, from the second network, response data sent in response to the request data, wherein the response data comprises a response header and a first webpage; and
  a data insertion module configured to:
    after a determination that insertion data is to be included with the first webpage, update the response data by adding insertion data to the first webpage, the insertion data comprising a script element that identifies a script that includes an instruction to display a second webpage within the first webpage, wherein the script further includes an instruction to add, to the first webpage, an inline frame associated with the second webpage, and wherein the script and the second webpage are hosted on a designated server having a first internet address;
    modify the response data to indicate that one or more requests issued from the second webpage hosted on the designated server are allowed, and wherein the updated response data is provided to the first network.

16. The gateway of claim 15, wherein the script includes an instruction specifying the first internet address, and the instruction to display the second webpage comprises the first internet address.

17. The gateway of claim 15, wherein the request header includes information identifying the origin of the request data.

18. The gateway of claim 15, wherein the script includes an instruction specifying a second internet address, and the instruction to display the second webpage comprises the second internet address, and wherein the gateway is further configured to:
  update the request data by replacing any occurrence of the second internet address within the request data with the first internet address; and
  provide the updated request data to the second network.

19. The gateway of claim 15, wherein the second webpage comprises one or more web services invocations, and wherein the data insertion module is further configured to add, to the response header, instructions enabling the web services invocations.

20. The gateway of claim 19, wherein the web services invocations are enabled based on the response data indicating that one or more requests issued from the second webpage hosted on the designated server are allowed.

21. The gateway of claim 15, wherein the response monitor is configured to determine whether insertion data is to be included with the first webpage is based on a particular subscriber.

* * * * *